UNITED STATES PATENT OFFICE.

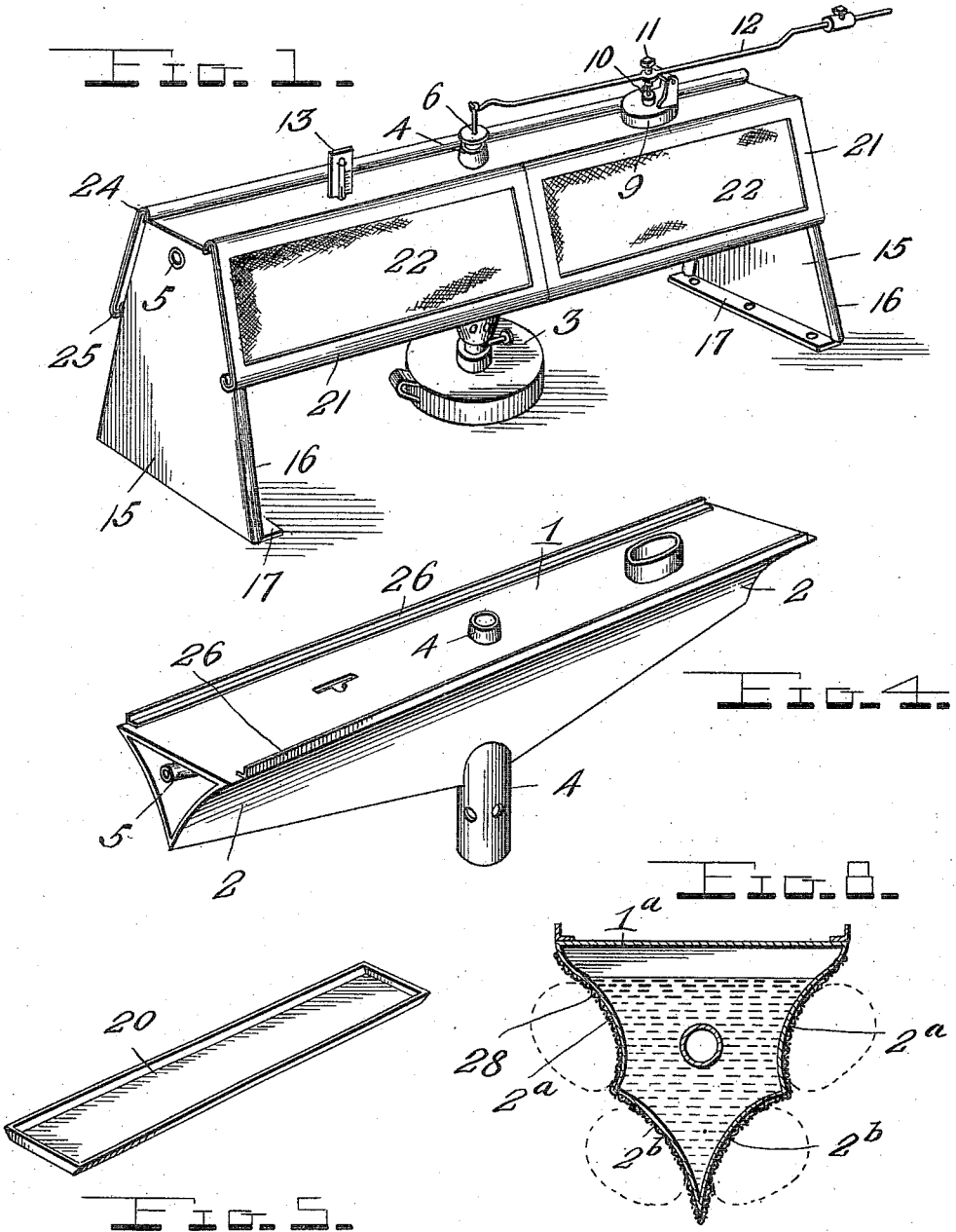

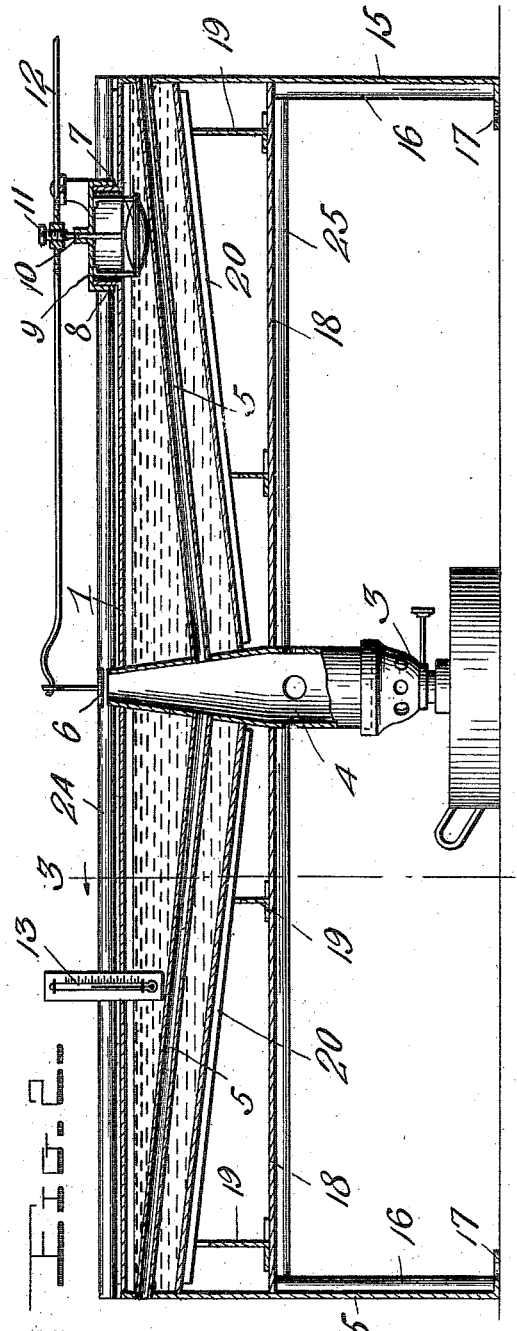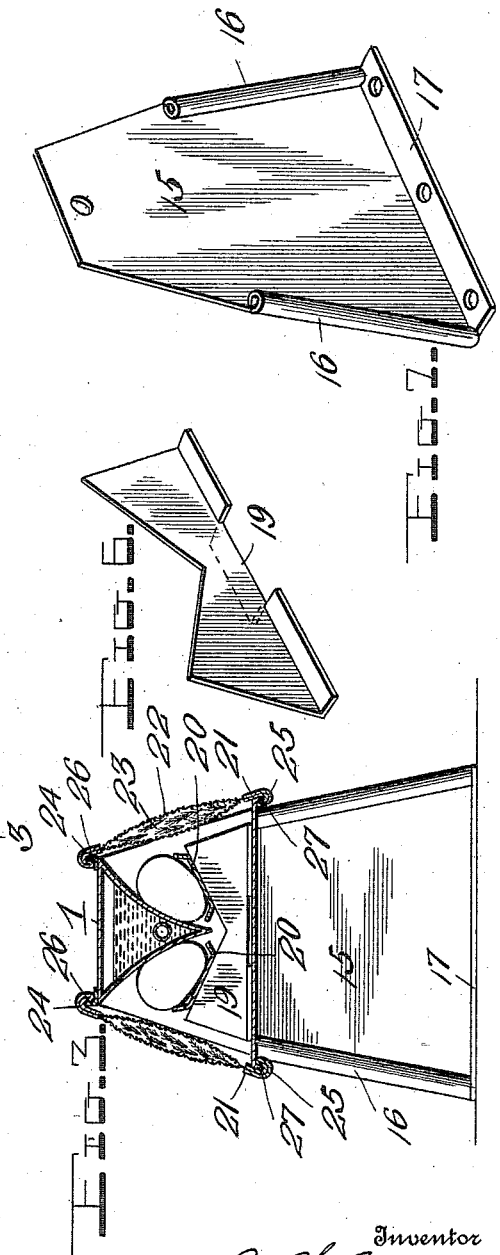

CYRUS W. ZIMMER, OF FORT WAYNE, INDIANA.

INCUBATOR.

985,964.   Specification of Letters Patent.   Patented Mar. 7, 1911.

Application filed August 31, 1909. Serial No. 515,455.

*To all whom it may concern:*

Be it known that I, CYRUS W. ZIMMER, a citizen of the United States, residing at Fort Wayne, in the county of Allen and State of Indiana, have invented certain new and useful Improvements in Incubators, of which the following is a specification, reference being had to the accompanying drawings.

My invention relates to improvements in incubators and its object is to provide one in which the actual conditions obtained in the operation of hatching eggs artificially will receive the same conditions as given to them by the hen in natural incubation.

With this object in view, the invention consists briefly in a heating tank having curved walls, to conform to the curvature of the eggs whereby the latter will be heated by contact, such curved surfaces of the heating tank being so arranged and the eggs so supported on trays with large end uppermost on inclined supports that all eggs of various sizes will be brought in contact with the tank and will receive the heat from the top or upper portion of the egg where the germ is naturally buoyed up.

The invention further consists in the novel combination and arrangement of parts and in the details of construction illustrated in the accompanying drawings in which—

Figure 1 is a perspective view of my incubator; Fig. 2 is a vertical longitudinal section; Fig. 3 is a vertical cross section taken on the plane indicated by the line 3—3 in Fig. 2; Fig. 4 is a perspective view of the water tank; Fig. 5 is a similar view of one of the egg trays; Fig. 6 is a detail view of one of the tray supports or brackets; Fig. 7 is a detail perspective view of one of the upright end members or supports for the tank; and Fig. 8 is a detail cross sectional view through a modified form of water tank.

The invention comprises a tank or receptacle 1 for the heating fluid which is preferably water. Said tank has two or more of its walls provided with curved surfaces 2 having substantially the curvature of an egg so that eggs supported against such surfaces will be heated by direct contact. Said curved surfaces 2 are also so arranged that they will contact the egg at or adjacent to its top where the germ is naturally buoyed up. In the embodiment illustrated in the drawing the tank is of substantially triangular shape in cross section with its apex pointed downwardly and its two upwardly and outwardly inclined side walls curved transversely to form the curved contact surfaces 2. When the tank is thus constructed it is supported in a horizontal position and the eggs are suitably supported on opposite sides of it against the surfaces 2. When the tank is made in the shape shown it resembles the breast or body portion of a hen and with the eggs supported as described, they will have a natural position in contact with the tank and with the large end of eggs uppermost. It will be understood that the tank may be of other shape or form, for example I have shown in Fig. 8 of the drawing the tank $1^a$ provided with curved contact surfaces $2^a$ arranged above similar contact surfaces $2^b$ which latter correspond to the surfaces 2 in the tank 1. By multiplying the curved contact surfaces in this manner the capacity of the incubator may be made as large as desired.

The tank 1 may be heated in any suitable manner but I preferably employ an oil lamp 3 arranged beneath an upright heat flue or pipe 4 which extends through the center of the tank. From the portion of the pipe 4 within the tank project substantially horizontal branch pipes 5 which extend in opposite directions longitudinally through the water in the tank and have their projecting outer ends open, as clearly shown in Fig. 2. The vertical flue or pipe 4 has its open upper end controlled by a damper 6, which in turn may be controlled and operated by any kind of temperature regulator. The temperature regulating device illustrated comprises a thermostatic wafer 7 supported in the water in the tank by a bracket 8 depending from a removable cap 9 arranged over an opening in the top of the tank. The wafer 7 actuates a pin 10 which is slidable in the cap and in contact with an adjusting screw 11 carried by a weighted lever 12 which latter has a damper 6 connected to one of its ends. The horizontal branch pipes 5 are preferably upwardly and outwardly inclined and the bottom of the tank is, preferably similarly constructed, that is, the lowest point of the bottom is at its center where the flue 4 is located. This construction insures a circulation of water in the tank, and hence an even temperature throughout the tank, because as the water is heated in the central portion of the tank it rises to the top and then gradually works back to the bottom and then inwardly along the latter to the center of the tank. The tank is provided with a thermometer 13 the bulb of which is arranged in the water in the tank so that the exact temperature of the water which is heating the eggs may be ascertained.

While the tank may be supported in any suitable manner sheet metal uprights 15 are preferably provided, the upper portions of said uprights forming the end walls of the tank 1 and having the flues or pipes 5 extending through them. These uprights or supporting legs 15 when made of sheet metal have their upright side edges folded inwardly as shown at 16 to reinforce and strengthen them and their bottom edges are bent at right angles to provide flanges 17 for a similar purpose. The flanges 17 also serve as attaching flanges and may be apertured to receive screws or similar fastenings whereby the device may be fastened to a shelf or other support on which latter the lamp 3 also rests. The uprights or leg members 15 are connected by a horizontal plate 18 which latter forms a shelf and has arranged upon it supports or brackets 19 for egg trays 20. The shelf 18 has a central opening to receive the lower portion of the flue 4. Four of the trays 20 are provided, two being on each side of the device between the flue 4 and the uprights 15 and said trays are supported in a downwardly and inwardly inclined position so that all of the eggs upon them will be brought into contact with the curved sides of the water tank no matter what size or shape the eggs may be. This feature of the invention is a valuable one and may be attained in other ways than by the use of trays such as illustrated. The trays are supported in downwardly and inwardly inclined position on the inclined upper edges of the brackets or supports 19 each of which latter is formed from a single piece of sheet metal arranged transversely on the top of the shelf 18 and having V-shaped upper edges and flanged bottom edges adapted to rest upon said shelf. Four of the brackets 19 are provided so that the trays will be supported adjacent their ends as shown.

My preferred means for protecting the eggs from drafts and securing proper ventilation is shown in Figs. 1 and 3, and comprises four slidable covers 21 which have porous portions to permit of the passage of air through them. Each of the slides 21 is preferably formed from sheet metal and is of rectangular shape its open central portion being covered by permeable sheathings 22 of thin cloth or fabric having between them a layer of feathers 23. The top and bottom edges of each slide 21 are bent upon themselves to provide channeled ways or grooves 24, 25. The upper ways 24 receive guide strips 26 secured to the side edges of the top of the water tank while the lower grooved ways 25 receive guide flanges 27 formed by bending the side edges of the shelf 18. The four slides or covers 21 are applied and removed from the ends of the device as will be readily understood.

While I have described in detail the preferred form of porous protecting and ventilating cover for the eggs I wish it understood that any other means of accomplishing this purpose may be employed.

From the foregoing description taken in connection with the accompanying drawings it is thought that the construction, operation and advantages of the invention will be readily understood without more extended explanation.

While I have shown and described in detail the preferred embodiment of my invention, I do not wish to be limited to the construction set forth since changes in the form, proportion and arrangement of parts, and in the details of construction may be made within the spirit and scope of my invention.

If desired I may interpose between the eggs and the surface of the water tank a fabric sheet of wool or other suitable material. I have indicated this cloth or fabric by the numeral 28 in Fig. 8, but it will be understood that it may be used on the tank shown in Fig. 4 if desired.

Having thus described the invention what I claim is:

1. In an incubator, the combination of a heated tank having a rigid, concave wall conforming to the curvature of an egg and disposed in a downwardly inclined position, and an egg supporting means arranged in converging relation with respect to the concave wall of the tank, whereby the egg will gravitate toward the tank and its upper portion will contact with the curved surface of the tank.

2. In an incubator, the combination of a heated tank having a rigid, concave wall curved to conform to the curvature of an egg and disposed in a downwardly inclined position, and a downwardly inclined flat egg support arranged adjacent to the curved wall of the tank and in converging relation therewith, whereby the egg will gravitate toward the tank and be supported with its upper portion in contact with the curved surface of the tank.

3. In an incubator, the combination of a water tank having a rigid concave wall curved to conform to the curvature of an egg and disposed in a downwardly inclined position, means for supporting an egg with its upper portion in contact with said curved surface of the tank, a porous covering for protecting the egg against drafts and allowing ventilation, and a heating means for the tank.

4. In an incubator, the combination of a water tank having a rigid concave wall curved to conform to the curvature of an egg and disposed in a downwardly inclined position, a downwardly inclined egg supporting tray arranged opposite said curved wall of the tank and adapted to cause the eggs supported by it to gravitate toward and contact with said curved wall of the tank, a porous covering for protecting the eggs against drafts and allowing ventilation, and a heating means for the tank.

5. In an incubator, the combination of a hot water tank having downwardly and inwardly converging concave walls curved transversely to conform to the shape of eggs, a heating means for the tank, and means supporting eggs on opposite sides of the tank and in contact with said curved walls.

6. In an incubator, the combination of a water tank having downwardly and inwardly converging, transversely curved concave walls, means for supporting the tank in a horizontal position, a vertical flue extending centrally through the tank, oppositely projecting branch flues arranged longitudinally in the tank, a heater to discharge in said central upright flue, a damper for controlling the passage of heat through said central upright flue, downwardly and inwardly inclined egg supporting means on opposite sides of the tank whereby eggs upon the same will gravitate downwardly toward and contact with the curved walls of the tank, and porous ventilating and protecting covers for the eggs on said supporting means.

7. In an incubator, the combination of a water tank having downwardly and inwardly converging, transversely curved concave walls, means for supporting the tank in a horizontal position, a vertical flue extending centrally through the tank, oppositely projecting branch flues arranged longitudinally in the tank, a heater to discharge in said central upright flue, a damper for controlling the passage of heat through said central upright flue, downwardly and inwardly inclined supports arranged beneath and on opposite sides of the tank, egg trays on the last mentioned inclined supports whereby eggs of different sizes in said trays will gravitate downwardly and contact with the curved walls of the tank, and porous ventilating and protecting covers for the eggs in said trays.

8. In an incubator, the combination of a hot water tank having downwardly and inwardly converging, transversely curved concave walls, means for supporting the tank in a horizontal position, a vertical flue extending centrally through the tank, oppositely projecting branch flues arranged longitudinally in the tank and projecting through its ends, a heater to discharge into said central upright flue, a damper for controlling the heat passing through said flue, a thermostatic device for operating said damper, said tank having its bottom lower at its center than at its ends to insure circulation of water therein, and means for supporting eggs on opposite sides of the tank and in contact with its curved surfaces.

9. In an incubator, the combination of a water tank of substantially triangular shape in cross section having downwardly and inwardly inclined concave side walls curved transversely, the bottom of said tank having its lowest point at its center, a centrally arranged upright flue in the center of said tank, means for supporting said tank in a horizontal position, and means for supporting eggs against the curved side walls of said tank.

10. In an incubator, the combination of a hot water tank of triangular shape in cross section and having its downwardly and inwardly inclined concave side walls curved transversely, means for supporting said tank in a horizontal position and means for supporting eggs against the curved side walls of said tank.

11. In an incubator, the combination of a hot water tank of triangular shape in cross section and having its side walls concaved and inclined downwardly and inwardly, and means for supporting eggs against said side walls of the tank.

12. In an incubator, the combination of a hot water tank having a downwardly inclined concave side wall and a downwardly inclined egg support arranged to oppose said side wall whereby eggs upon said support will gravitate toward and contact with said wall.

13. In an incubator, the combination of a hot water tank of substantially triangular shape in cross section, uprights for supporting the tank in a horizontal position and forming the end walls of the tank, and means carried by said end supports for supporting eggs against the side walls of the tank.

14. In an incubator, the combination of a horizontally disposed water tank of substantially triangular shape in cross section and having its side walls inclined downwardly and inwardly and concaved to conform to the curvature of an egg, means for supporting said tank, means for heating said tank, and means for supporting eggs against the opposite sides of said tank whereby the upper portions of the eggs will engage the concaved side walls of the tank.

15. In an incubator, the combination with a horizontally disposed water tank of triangular shape in cross section and having its two side walls inclined downwardly and inwardly and concaved to conform to the curvature of an egg, said side walls being also inclined in an upward longitudinal direction from the center to the opposite ends of the tank, end supports for the tank, a horizontal support disposed beneath the tank and having inwardly and downwardly extending inclines, egg trays arranged on said inclines whereby the eggs therein will be held in contact with the concaved side walls of the tank, porous coverings between the side edges of said horizontal support and the upper edges of the tank, a smoke flue extending vertically through the center of the tank, a thermostatically controlled damper for the top of said flue, and branch flues extending from the smoke flue and projecting longitudinally through the tank.

16. In an incubator, the combination of a horizontally disposed water tank of substantially triangular shape in cross section and having its side walls inclined downwardly and inwardly, end uprights for supporting the tank, a horizontal member arranged beneath the tank and united to said uprights, brackets on said member and having downwardly and inwardly inclined upper edges, egg supporting trays on said inclined edges of the brackets, and means for heating said tank.

17. In an incubator, the combination of a horizontally disposed water tank of substantially triangular shape in cross section and having its side walls inclined downwardly and inwardly, end uprights for supporting the tank, a horizontal member arranged beneath the tank and united to said uprights, means on said member for supporting eggs in contact with the side walls of the tank, means for heating the tank, longitudinal guides on the side edges of said member and the upper edges of the tank, and open slides engaged with said guides and having porous coverings for protecting the eggs.

18. In an incubator, the combination of a heated tank having a wall inclined downwardly, and an egg support inclined downwardly and arranged in converging relation with respect to said inclined wall of the tank, whereby the egg will gravitate toward the tank and have its upper portion contact with said inclined wall of the tank.

19. In an incubator, the combination of a heated tank having a downwardly inclined wall, a flat egg support arranged in a downwardly inclined position and in converging relation with respect to the inclined wall of the tank, whereby the egg will gravitate toward the tank and its upper portion will contact with said inclined wall of the tank, and a porous covering for protecting the egg against drafts.

20. In an incubator, the combination of a heated tank having its opposite side walls provided with downwardly and inwardly inclined surfaces, downwardly and inwardly inclined egg supports arranged on opposite sides of the tank and in converging relation with respect to said inclined surfaces of the walls of the tank, whereby eggs on said supports will gravitate toward the tank and their upper portions will contact with said inclined surfaces on the walls of the tank, and means for protecting the eggs from drafts and permitting ventilation.

In testimony whereof I hereunto affix my signature in the presence of two witnesses.

CYRUS W. ZIMMER

Witnesses:
FRANK L. AESCH,
EVA M. TAYLOR.

---

Copies of this patent may be obtained for five cents each, by addressing the "Commissioner of Patents. Washington, D. C."